Patented July 12, 1932

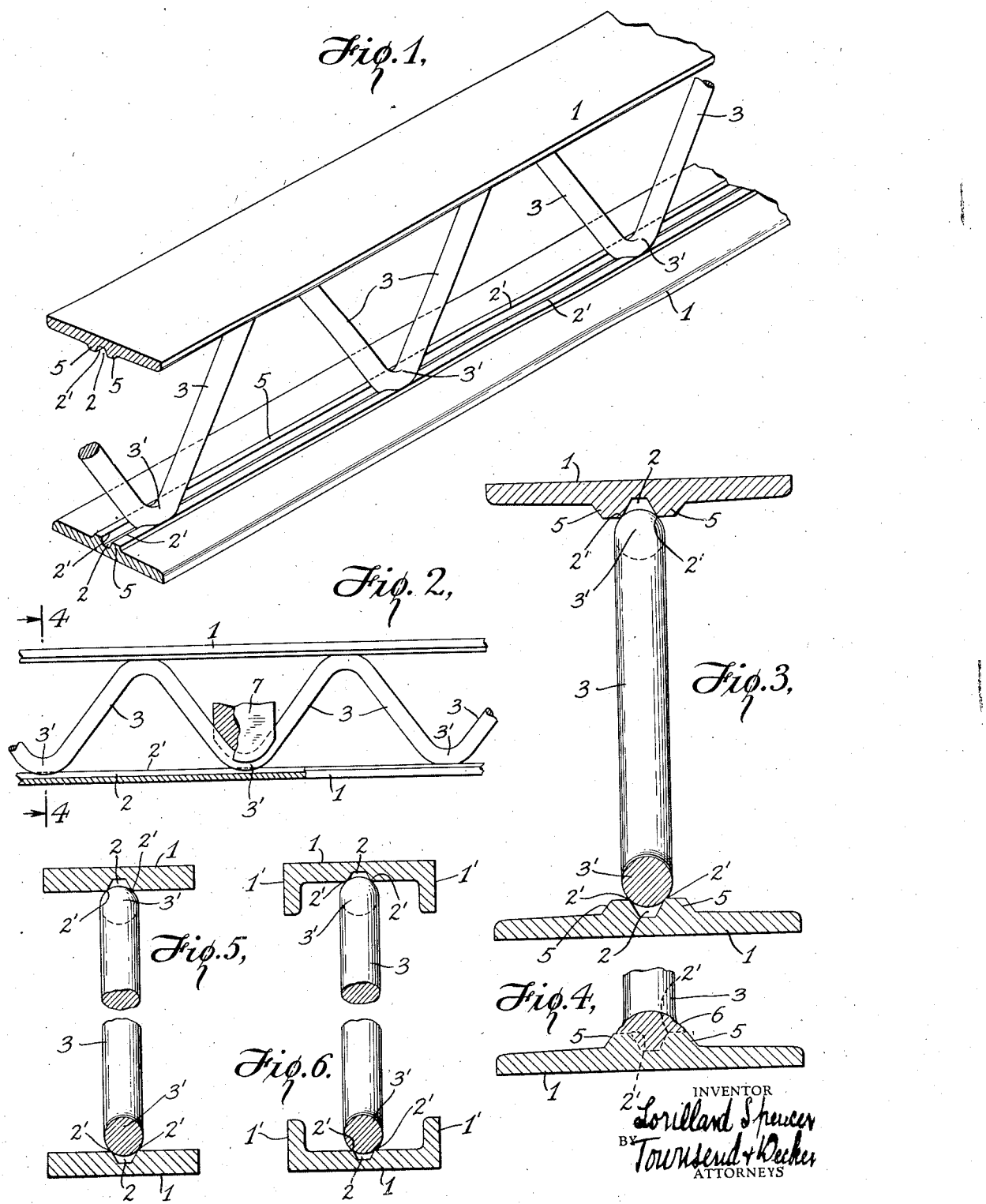

1,866,583

UNITED STATES PATENT OFFICE

LORILLARD SPENCER, OF NEW YORK, N. Y.

COMPOSITE METAL WORK

Application filed April 6, 1928. Serial No. 268,041.

My invention relates to composite fabricated metal work wherein the members are secured together by an electrical weld made by what is known as the electric resistance method and more particularly to those forms of metal work wherein a bar or base element has a number of parts forming the other element of the composite structure projecting from and secured to it as for instance in skeleton or lattice-work girders, grilles, frames, or other constructions.

The object of my invention is to provide a construction the elements of which may be readily and firmly secured together by the electric weld and which shall be of maximum strength and minimum weight and adapted to provide effective resistance to bending, torsional twisting or other strains or loads. My invention further permits the fabrication of the structure at little cost by reason of the cheapness of the elements employed in the structure and the facility with which those elements may be effectively united. The invention consists in the novel construction of composite or fabricated metal work hereinafter more particularly described and then specified in the claims. The invention being particularly useful in the construction of girders, trusses or the like of skeleton form it will be shown and described as applied and used in structures of that kind.

In the accompanying drawing:

Fig. 1 is a perspective view of a construction embodying my invention in one of its preferred forms.

Fig. 2 is a side elevation illustrating the relation or assemblage of the parts preparatory to the welding operation.

Fig. 3 is a vertical enlarged cross section of Fig. 2 on the line 4—4 before the welding operation.

Fig. 4 illustrates in cross-section the union between the bend of the zig-zag and the longitudinal or main supporting member the view being taken on the line 4—4 of Fig. 2 after the welding operation is completed.

Figs. 5 and 6 illustrate in vertical cross-section modifications in the form of the longitudinal or main supporting member with the zig-zag or bent member applied thereto before welding.

In the various figures 1 indicates the main or base element of the composite structure shown herein as constituting the longitudinal tension or compression member of a truss or girder. In the form of my invention illustrated said element 1 is a bar or plate and may or may not have at its edges the flanges 1' indicated in Fig. 6. Said element 1 is preferably a rolled bar or plate and is provided with a longitudinal groove or recess indicated at 2. In the simplest form of my improved construction one longitudinal groove is employed although it would be within my invention to employ a number of them each having the stay, strut or brace member or members of the girder or other device secured in it as will be presently described.

As will be readily understood the groove 2 in the longitudinal element 1 may be formed in the process of rolling the bar or element 1.

In the preferred form of my invention, shown in Figs. 1, 2, 3, and 4 the member 1 is provided with the longitudinal ridge or rib 5 in which the groove 2 of any desired shape is formed as shown. Said ridge and groove may be formed in the operation of rolling the bar or member 1.

3 indicates the strut or brace member consisting of a bar or rod bent into a zig-zag or other form such that contiguous strut members converge at an angle uniting in a bend indicated at 3' where attachment is made to the longitudinal bar 1. The rod or bar forming the zig-zag member may be a plain round bar as shown in the cross-section so that at the bend it will present rounded surfaces which will engage the edges 2' of the longitudinal grooved member 1 in a manner to furnish points or areas of limited contact at the crossing surfaces adapted for heating in the initial stage of the process of welding by the electric resistance method. It would be within my invention, however, to employ other forms of rod provided that at the outside of the bend the element 3 present surfaces which do not correspond with the groove 2, and which will cross the longitudinal edge of the groove and thereby form the limited contacts already referred to.

In the form of my invention illustrated in Figs. 5 and 6 the under or inner side of the plate 1 between the flanges is flat and the edges 2' with which the bend engages when partially inserted into the groove for welding practically lies in the same plane as said surface. The member 3 engages upon the edges 2' at the mouth of the groove as in the case of the form of bar shown in Fig. 1. The form shown in Fig. 1 is preferred, however, since the groove in that instance will not weaken the member 1 to the same extent as in the case of Figs. 5 and 6 while moreover a more ready or rapid heating of the elements at the welding junction will take place owing to the fact that the heat will not be as readily conducted away in the case of Fig. 1 as it would in the case of the form Figs. 5 and 6 where the edge portion is in direct connection with the main mass or body of the plate. In other words the mass formed by the projecting portion of the slotted ridge being limited tends to confine the heating to the point of junction and thereby assist in the welding operation.

The bar or rod 3 obviously might be of other than round construction and still provide the limited contact surfaces at the bend where the diagonals of the zig-zag converge and contact with the edges of the groove.

As will be seen therefore the form in cross-section of the element 3 is capable of large variation consistently with providing at the outside of the bend a limited contact where the rounded surface of the bend engages with the edges.

In welding up the structure the apices of the bends formed by the converging diagonals on the element 3 are partially entered in the slot 2 and the rounded surfaces of the portions 3' contact with the edges 2' and form limited points of contact between the two elements adapted to become readily heated by the passage of the current. On the application of electric current and of pressure exerted by a suitable welding electrode 7 applied to and fitting into the inside of the elbow or bend a heating and partial fluxing of the rod and contiguous parts of the bar 1 ensue. The area of softening or fluxing increases as the part 3' is crowded into the groove by the pressure of the electrode, and there finally results a welding of the apex or bend forming the elbow within said groove whereby the parts are effectually secured to one another and firmly held against bending sidewise and against damage or impairment of the joint by strains exerted thereon in any direction.

As will be obvious the effectiveness of the joint depends upon the twofold factors of a mechanical securing of the attached element in a groove and the welding of the contiguous portions of the elements to one another by a weld at the apex formed by the converging diagonals of the element 3 when they enter the groove.

In the preferred production of the welded joint when made as above described a portion of the fused or softened metal is crowded over or displaced at the outside of the groove in the form of shoulders 6 forming substantially continuations of the ribs 5 and which assist in bracing and holding the parts in their finished relation. The shoulder 6 will conform to the shape of the inner surface of the welding electrode which may be varied in that respect as described to produce a finished or neat appearing joint at the portion 6 of the welded union.

Obviously in the construction of a girder the invention might be extended to produce a girder in which there are diagonals 3 crossing one another to produce what is known as a lattice work girder in which case, however, it would be desirable to provide a zig-zag or bent member for each of the longitudinal or compression members of the structure and to unite bends of the zig-zag to one another by any desired means.

What I claim as my invention is:

1. A skeleton girder or the like comprising a bar having a longitudinal groove formed in the surface thereof and a strut or brace portion consisting of a rod and bent to a zig-zag form to form diagonals converging in the groove, the apices of the angles formed by the converging strut portions meeting within said groove and the rod welded against the edges and to the walls of the groove.

2. Composite metal work one member of which is provided with a longitudinal grooved ridge while the other member consists of a bent rod rounded in cross-section and bent in a plane coinciding with the groove and having portions converging toward the axis of the groove said converging portions being seated within and welded to the edges of the groove at the apex or outside angle of the bend.

3. A composite metal girder comprising a plurality of longitudinal beams provided with longitudinally extending ribs thereon, spaced to provide a longitudinal groove therebetween and having outer surfaces spaced above the adjacent surfaces of the body of said beams, a connecting member extending between said beams and bent angularly to form two series of apices seated in said grooves, said connecting members having initially a transverse thickness greater than said grooves and being electrically welded at said apices to the inner faces of said groove and to the outer surfaces of said ribs to form substantially symmetrical unions extending across said ribs and groove.

4. A composite metal girder comprising a pair of longitudinal beams and a connecting member, said beams being formed with surface grooves proportioned to prevent the admission of said connecting member into the depth of the groove, said connecting member being electrically welded to said beams at said groove and at a plurality of points on each groove, with the material of said member attached to the side walls of said grooves.

5. A composite metal girder comprising a longitudinal beam and a connecting member, said beam including a surface groove having relatively sharp edges and proportioned to support said connecting member initially and prevent the admission of the same into the depth of the groove, said connecting member being electrically welded to the material of said beam within said groove and upon said beam adjacent said groove.

Signed at New York in the county of New York and State of New York this 31st day of March A. D. 1928.

LORILLARD SPENCER.

CERTIFICATE OF CORRECTION.

Patent No. 1,866,583.

July 12, 1932.

LORILLARD SPENCER.

It is hereby certified that error appears in the printed specification of the above numbered patent requiring correction as follows: Page 2, line 98, claim 1, for the word "in" read to form apices at; lines 99, 100 and 101, strike out the words "formed by the converging strut portions meeting within said groove and" and insert the word "of"; and in same line 101, after the word "rod" insert the words being supported above the bottom of said groove by the side edges thereof and; and that the said Letters Patent should be read with these corrections therein that the same may conform to the record of the case in the Patent Office.

Signed and sealed this 9th day of July, A. D. 1935.

(Seal)

Bryan M. Battey
Acting Commissioner of Patents.